Patented June 10, 1924.

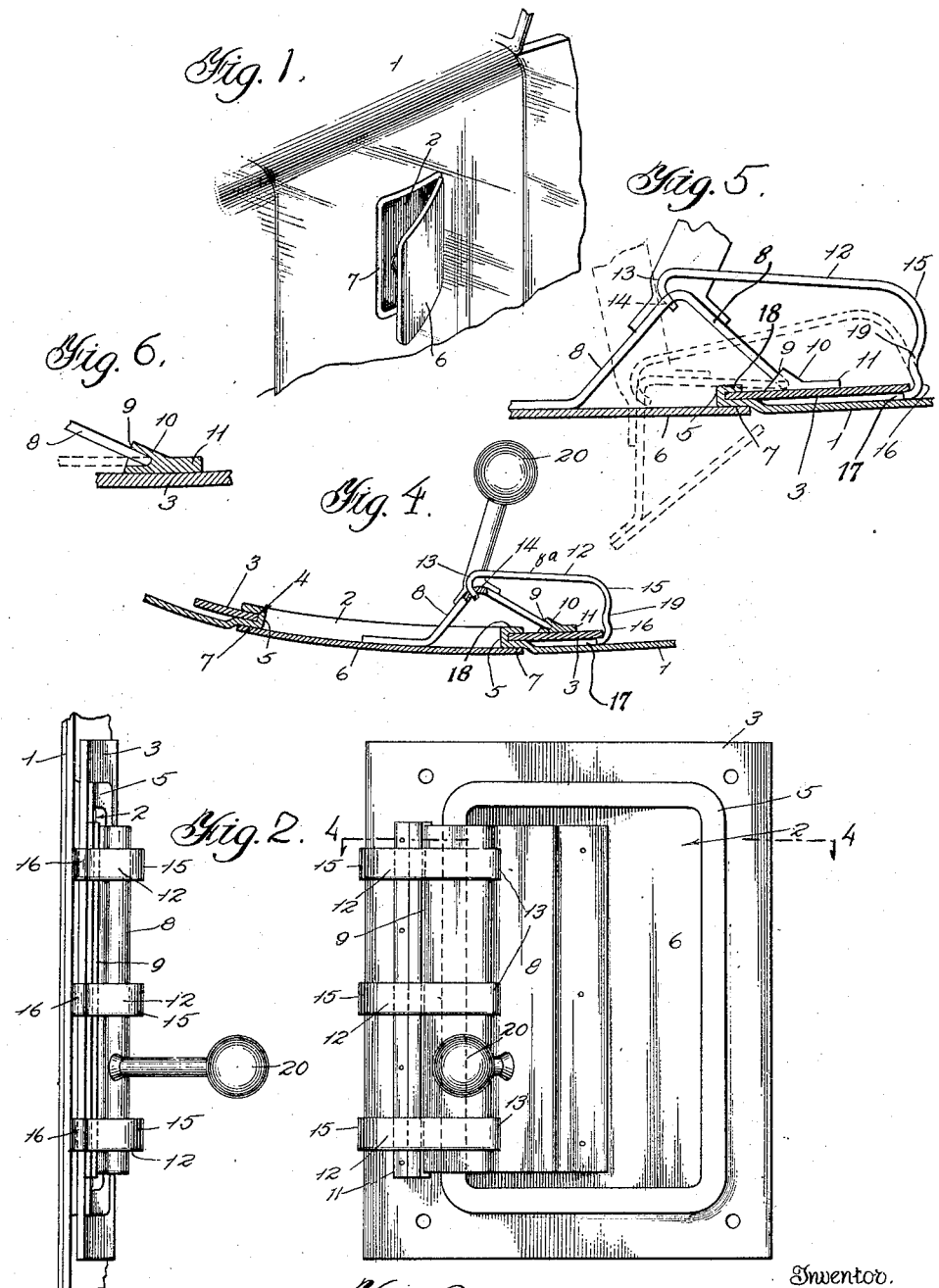

1,497,624

UNITED STATES PATENT OFFICE.

GEORGE W. WELLS, OF AMESBURY, MASSACHUSETTS, ASSIGNOR TO WALKER BODY COMPANY, OF AMESBURY, MASSACHUSETTS, A CORPORATION OF MASSACHUSETTS.

COWL VENTILATOR FOR MOTOR VEHICLES.

Application filed June 8, 1923. Serial No. 644,227.

*To all whom it may concern:*

Be it known that I, GEORGE W. WELLS, a citizen of the United States, residing at Amesbury, in the county of Essex and State of Massachusetts, have made a certain new and useful Invention in Cowl Ventilators for Motor Vehicles, of which the following is a specification.

Figure 1 is a perspective view of the invention as applied.

Figure 2 is an end view of the same.

Figure 3 is an inside face view of the same.

Figure 4 is a section on the line 4—4, Figure 3.

Figure 5 is a similar view on a somewhat larger scale showing the ventilator open in dotted lines.

Figure 6 is a fragmentary sectional detail view of the pivot of the ventilator.

The invention has relation to cowl ventilators for motor vehicles, having for an object the provision of an improved ventilator particularly applicable to the side of the cowl. Another object is to provide a pivoted ventilator having spring means for retaining its pivotal engagement, and capable of ready installation and removal. Other objects and advantages will hereinafter appear.

The invention consists in the novel construction and combinations of parts, as hereinafter set forth.

In the accompanying drawings illustrating an embodiment of the invention, the numeral 1 designates the cowl of a motor car, one or both side walls of which are provided with an opening 2, a rectangular frame 3 having an opening 4 of similar size to the opening 2 and having its inner marginal portion engaged by a reverse bend 5 of the cowl marginal to said opening and being thereby held in place.

6 is a closure plate or cover for said opening of the cowl lapping the margin thereof upon the outer side, said margin being rebated at 7, and said cover fitting within the rebate flush with the side of the cowl to form a close weather-proof joint of an inconspicuous nature.

The cover plate has secured thereto upon the inner side thereof an inward, rearward and outward extending bowed plate 8, the rear edge portion 8$^a$ of which has pivotal engagement with an open-side seat 9, located between the inner face of the frame 3 and an out-turned edge 10 of a vertical metal strip 11, the latter secured to the frame 3. Means are provided to retain said cover in said pivotal engagement, consisting of leaf or strap springs 12, three being shown and provided with bent forward ends 13 engaging slots 14 of the bowed plate 8, and with longer bent rear ends 15, having terminal hooks 16 engaging in the interval 17 between the rectangular frame or face plate 3 and the side of the cowl, the two ends of the respective springs snapping into place in said slots 14 and seats 17, with sufficient tension to securely hold the cover plate 6 closed, and to retain said pivotal engagement as stated.

The cover plate being now opened pivotally, the forward ends of the springs 12 engaged in the slots 14 will be moved with the cover plate towards a position of alignment with the pivots or seats 9 and the seats 17 of the rear ends of the springs (see Figure 5), the latter being tensioned to a greater and increasing degree during this movement, and this position of alignment having been reached and passed, the springs will contract again to hold the cover plate in open position (see Figure 5) the outer lateral face of the bowed plate 8 contacting with the bend 5 of the cowl at 18 to limit this opening movement.

In closing the cover plate, a slight inward movement thereof will again align the two ends of the respective springs with the pivotal edge of the cover plate, and this position of alignment having been reached and passed, the springs will contract to restore the cover plate to and to hold it in closed position.

The rear ends of the springs 12 are provided each with a reverse bend 19 to stiffen its action. The bowed plate or extension 8 is provided with a suitable handle 20 within reach of the driver of the car and whereby the cover plate may be readily opened and closed.

The opening and closing movement of the ventilator is accomplished readily by a simple movement of the hand of the driver in the direction of opening or closing after grasping the handle 20. Spring means being provided to hold the cover plate closed makes the closure further weatherproof.

I claim:—

1. In a closure device, a wall having an opening, and an open-side seat along one edge of said opening, a cover for said opening having an extension the free edge of which has pivotal engagement with said seat, and spring means for retaining said pivotal engagement and tensioned to hold the cover closed and adapted to be tensioned to hold the same open.

2. In a cowl ventilator for motor vehicles, a cowl having an opening and an open-side seat along one edge thereof, a cover having an extension the free edge of which has pivotal engagement with said seat, and spring means for retaining said pivotal engagement and adapted to have the tension thereof increased as the cover is opened and to contract at the end of the opening movement and including strap springs having bent ends engaging said extension.

In testimony whereof I affix my signature.

GEORGE W. WELLS.